(12) United States Patent
Magee

(10) Patent No.: US 8,926,514 B2
(45) Date of Patent: Jan. 6, 2015

(54) ITERATIVE TIME DELAY VALUES FOR ULTRASOUND BEAMFORMING

(75) Inventor: David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1175 days.

(21) Appl. No.: 12/726,481

(22) Filed: Mar. 18, 2010

(65) Prior Publication Data

US 2010/0249594 A1  Sep. 30, 2010

Related U.S. Application Data

(60) Provisional application No. 61/162,878, filed on Mar. 24, 2009.

(51) Int. Cl.
  *A61B 8/14* (2006.01)
  *G10K 11/34* (2006.01)
  *G01S 7/52* (2006.01)
  *G01S 15/89* (2006.01)

(52) U.S. Cl.
  CPC .......... *G10K 11/346* (2013.01); *G01S 7/52026* (2013.01); *G01S 7/52034* (2013.01); *G01S 15/8915* (2013.01)
  USPC ......................................................... 600/443

(58) Field of Classification Search
  USPC ................................................. 600/437, 443
  See application file for complete search history.

(56) References Cited

U.S. PATENT DOCUMENTS

2001/0051766 A1 * 12/2001 Gazdzinski ................... 600/309
2009/0326375 A1    12/2009 Magee

OTHER PUBLICATIONS

Thomenius, Kai E., Recent Trends in Beamformation in Medical Ultrasound, 2005, IEEE Ultrasonics Symposium, pp. 1-113.*

* cited by examiner

*Primary Examiner* — Tse Chen
*Assistant Examiner* — Rochelle Reardon
(74) *Attorney, Agent, or Firm* — Alan A. R. Cooper; Frederick J. Telecky, Jr.

(57) ABSTRACT

An iterative method of computing time delay values for ultrasound receive beamforming. Sensing signals are generated by transducer elements in a transducer array which detect reflected sound waves from a target tissue region for a time sample (n) for a first focal point and at a later time sample (n+1) for a second focal point. Respective time delays are calculated for time sample (n) for sensing signals received from the transducer elements for focusing the reflected sound waves from the first focal point. For the later time sample (n+1), respective time delays are calculated for the sensing signals received from the transducer elements for focusing the reflected sound waves from the second focal point, wherein the respective time delays for time sample (n+1) are computed iteratively from the respective time delays for time sample (n).

2 Claims, 4 Drawing Sheets

ITERATIVE TIME DELAY VALUES FOR ULTRASOUND BEAMFORMING

CROSS REFERENCE TO RELATED APPLICATIONS

This application claims the benefit of Provisional Application Ser. No. 61/162,878 entitled "Method of Computing Time Delay Values to Improve DSP Beamformer Performance" filed Mar. 24, 2009, which is herein incorporated by reference in its entirety.

FIELD OF THE INVENTION

Embodiments of the invention relate to beamformers for ultrasound and related beamforming algorithms, and integrated circuits (ICs) and ultrasound systems therefrom.

BACKGROUND

Beamforming is a signal processing technique used in sensor arrays for directional signal transmission or reception. Spatial selectivity is achieved by using adaptive or fixed receive/transmit beam patterns.

One medical application that uses beamforming is for ultrasound diagnostics. Ultrasound energy is focused at target tissue by a transmit beamformer, and ultrasound energy modulated and returned by the target tissue is focused by a receive beamformer. The receive beamformer may provide signals for generation of B-mode images, color Doppler or spectral Doppler information representing the target tissue, or combinations thereof. Beamforming systems can provide real-time, cross-sectional (tomographic) 2D images of human body tissue or the tissue of another subject.

FIG. 1 shows a simplified block diagram depiction of a conventional delay and sum ultrasound receive beamformer system 100 for imaging target tissue 105. Beamformer system 100 comprises a plurality (M) of transducer elements 112 shown as eight transducer elements $112_1$-$112_8$ which each comprise separate piezoelectric transducers that convert sound waves echoed by the target tissue 105 into electrical signals in the receive mode. Although only eight (M=8) transducer elements $112_1$-$112_8$ are shown in FIG. 1, a practical ultrasound receive beamformer system 100 may have many more transducer elements, such as several hundred or more.

The data processing paths $115_1$-$115_8$ each comprise in serial connection a voltage controlled amplifier (VCA) 116, an analog to digital converter (ADC) 117 for digital conversion of the amplified transducer signal, and an integer delay 118 for adding the integer portion of the desired delay value. A plurality of interpolation filter banks 119 each comprising a plurality of interpolation filters (P) is also provided. The plurality of interpolation filters (P) in each interpolation filter bank $119_1$-$119_8$ provide a plurality of different fractional portions of the desired delay value for each of the data processing paths $115_1$-$115_8$, since as known in the art the desired delay values are not integer multiples of the ADC sampling period (Ts) because in general the desired timing resolution (Tres) is <Ts.

For conventional ultrasound applications, Tres is generally between 1 to 10 nsec and the Ts of the ADCs 117 is generally from 20 to 200 nsec (corresponding to 50 MHz to 5 MHz operation). Tres thus determines the number of interpolation filters (P) in each interpolation filter bank $119_1$-$119_8$ needed to provide the plurality of different fractional delay portions for each of the dedicated data processing paths $115_1$-$115_8$ for beamformer system 100. For example, without decimation filtering, P=ceil(Ts/Tres) to achieve the desired Tres, such as P=20 interpolation filters in each interpolation filter bank $119_1$-$119_8$ in the case Ts=20 nsec and Tres=1 nsec. The ceil function returns an integer by rounding its argument towards infinity (upward).

Each of the dedicated data paths $115_1$-$115_8$ also include an apodization gain block 120 so that each received signal is scaled (i.e. weighted) by a desired value by an apodization factor to reduce the grating side lobe effects in the later formed beamformed signal due to lateral pressure field amplitude variations and the spacing of the transducer elements $112_1$-$112_8$. Apodization factors can generally be changed on a sample-by-sample basis. An adder 121 sums the respective signals from each of the data paths $115_1$-$115_8$ provided by the respective apodization gain blocks $120_1$-$120_8$ to generate the desired beamformed signal which can then be used to form an image of the target tissue 105 on a suitable display device.

The conventional delay and sum ultrasound receive beamformer system 100 described above produces effective focal points along a given scanline (e.g., such as the scanline shown in FIG. 1) to focus the receive echoes from portions of target tissue 105 that lie along a given scanline. When the receive beamformer system 100 beamforms more than one scanline, the beamforming is commonly referred to as Multiple Line Acquisition (MLA) for a given transmit pulse sequence.

In a conventional beamforming implementation, such as when using conventional delay and sum ultrasound receive beamformer system 100, the filtered signal response from each of the respective interpolation filter banks $119_1$-$119_8$ from the received signal originating from its associated single associated transducer element 112 can be written as a summation over the filter coefficients k for each of the P interpolation filters in interpolation filter bank 119 as:

$$y_i[n] = \sum_{k=-\infty}^{\infty} h_{i(n)}[k] x_i[n - k - d_i[n]] \text{ for } 0 \leq n \leq N - 1 \qquad \text{Equation \#1}$$

Where:
$x_i[n]$ is the signal from the $i^{th}$ receive data path channel $115_1$-$115_8$ at time sample n.
$h_{i(n)}[k]$ is the $k^{th}$ coefficient of the respective interpolation filter in interpolation filter bank 119 for the $i^{th}$ receive channel at time sample n.
$y_i[n]$ is the filtered signal for the $i^{th}$ receive data path channel $115_1$-$115_8$ at time sample n.
$d_i[n]$ is the integer delay for $i^{th}$ receive data path channel $115_1$-$115_8$ at time sample n.

It is noted that this filtering operation is piece-wise linear, i.e. at each sample instance n, the output of interpolation filter bank 119 is a linear combination of input samples. The beamformed signal response for a single scanline is found by summing (e.g., using summer 121) the responses from each of the data paths $115_1$-$115_8$ after processing by apodization gain blocks 120 to represent signals from all M receive transducer elements $112_1$-$112_8$, which can be expressed as:

$$z[n] = \sum_{m=0}^{M-1} a_m[n] \sum_{k=-\infty}^{\infty} h_{m(n)}[k] x_m[n - k - d_m[n]] \qquad \text{Equation \#2}$$

Where $a_m[n]$ is the apodization factor for the $m^{th}$ receive signal at time sample n, and z[n] is the beamformed received signal at time sample n.

The delay computations are related to the ultrasound transducer array geometry as well as the speed of sound for the frequency used in the particular tissue medium. An issue arises as how to efficiently compute the integer delay values and fractional delay values at each time sample instant for each of the data path channels in the receive beamformer. In the case of the transmit beamformer the time delay values are still needed, but the time delay values are only needed only once per focal point (i.e., not computed for each time instant).

Conventionally, integer and fractional delay values are computed in terms of discrete-time samples by multiplying by the sampling rate of the beamforming system, $f_s$, with the resulting computation involving trigonometric functions including both $\sin(\theta)$ and $\cos(\theta)$ and numerous multiplications (See Equation 3 described below). The resulting high computational burden is thus not well suited for real-time implementation, and thus generally limits the number of channels supported by a particular computational implementation (e.g. FPGA, DSP, or ASIC implementation).

SUMMARY

Disclosed embodiments provide geometric relationships between the focal point and system parameters that allow a simplified iterative equation for calculating integer and fractional time delays that eliminates multiplier dependencies for ultrasound receive beamforming and beamformer systems. Respective time delays are calculated for sensing signals received from the transducer elements in the transducer array for focusing reflected sound waves from a first focal point. At a later time sample (n+1), respective time delays are calculated for the sensing signals received from transducer elements for focusing the reflected sound waves from a second focal point. The respective time delays at time sample (n+1) are computed iteratively from the respective time delays at time sample (n).

Problems solved by disclosed embodiments include reducing the number of trigonometric calculations and number of multipliers which reduces the cycle count for a given ultrasound beamformer implementation. Disclosed embodiments provide improved cycle time performance per block of beamformed data, allow more blocks of beamformed data and more scanlines to be processed per computational resources (e.g. DSP(s), FPGA(s), ASIC(s)).

DETAILED DESCRIPTION

Figure 1:
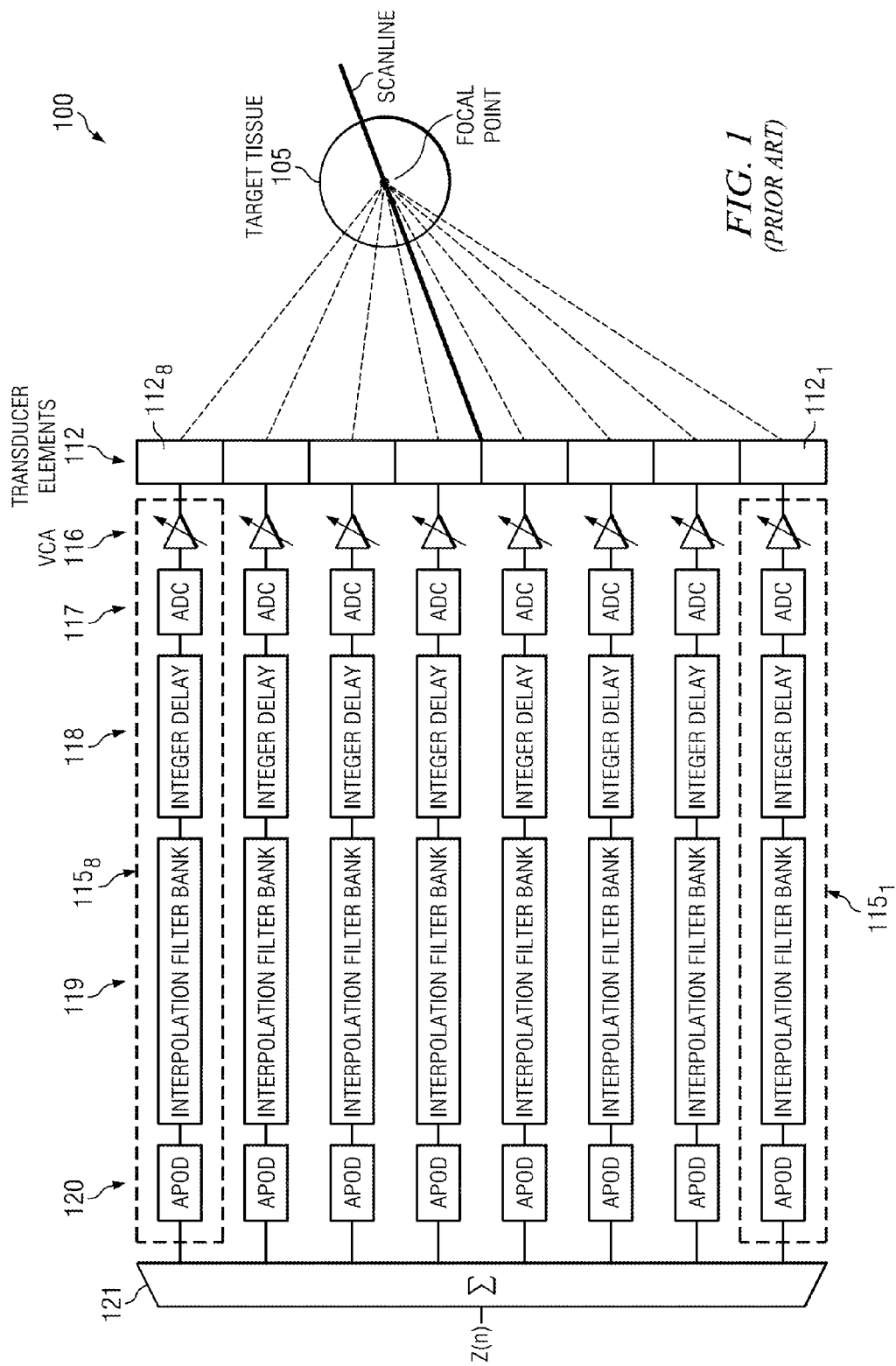
FIG. 1 is a simplified block diagram depiction of a conventional delay and sum ultrasound receive beamformer system for imaging target tissue.

Disclosed embodiments are described with reference to the attached figures, wherein like reference numerals are used throughout the figures to designate similar or equivalent elements. The figures are not drawn to scale and they are provided merely to illustrate disclosed features. Several disclosed aspects are described below with reference to example applications for illustration. It should be understood that numerous specific details, relationships, and methods are set forth to provide a full understanding of this Disclosure. One having ordinary skill in the relevant art, however, will readily recognize that the subject matter in this Disclosure can be practiced without one or more of the specific details or with other methods. In other instances, well-known structures or operations are not shown in detail to avoid obscuring certain features. Disclosed embodiments of the invention are not limited by the illustrated ordering of acts or events, as some acts may occur in different orders and/or concurrently with other acts or events. Furthermore, not all illustrated acts or events are required to implement a methodology in accordance with this Disclosure.

Figure 2:
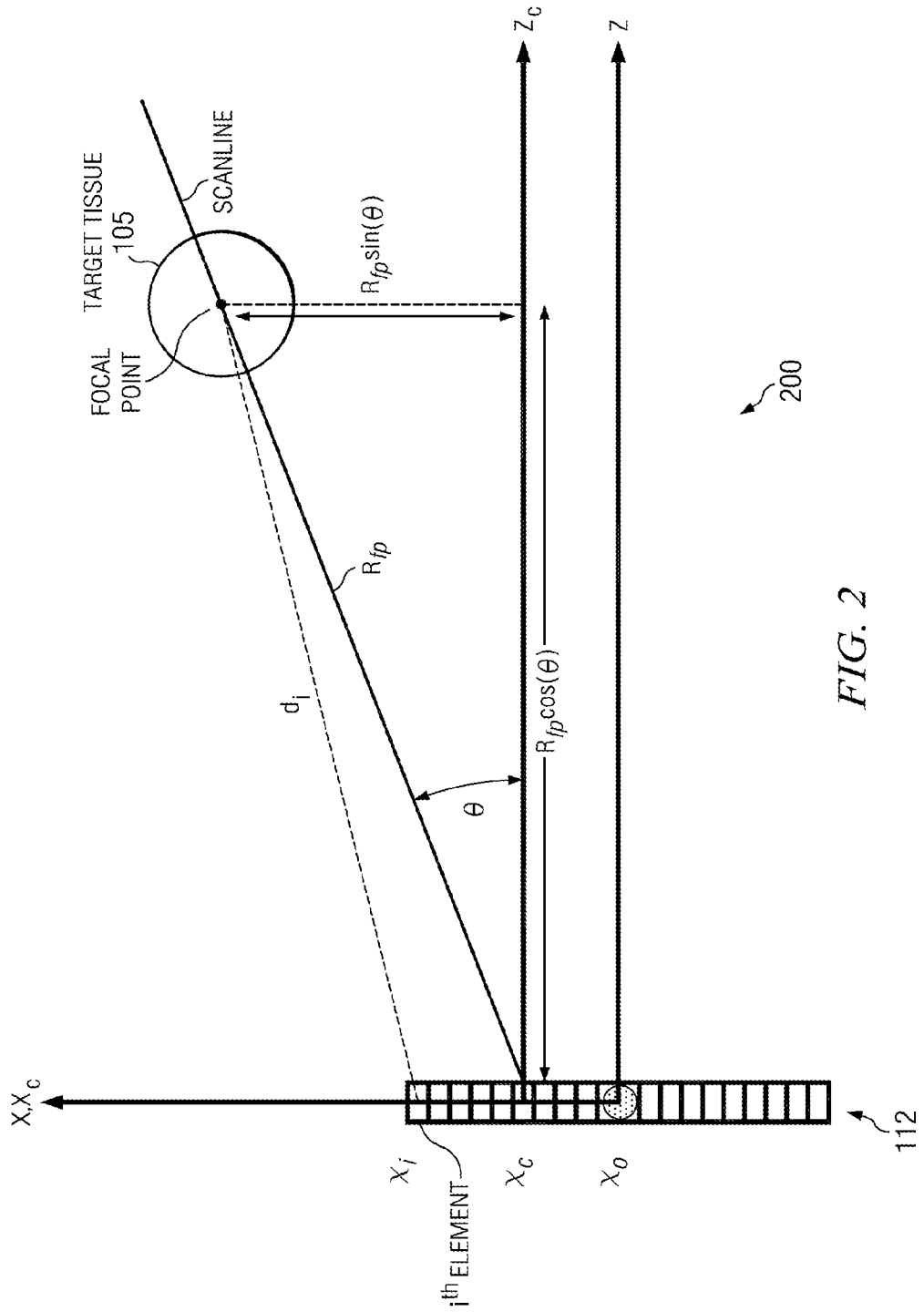
FIG. 2 shows a general geometric configuration with the elements of an ultrasound transducer array configured in a column with an arbitrary focal point along an arbitrary scanline.

FIG. 2 shows a general geometric configuration 200 with the respective elements of an ultrasound transducer array 112 configured in a column shown with an arbitrary focal point along an arbitrary scanline (e.g. within a tissue sample region) at some time sample instant n. Although the transducer elements in the array 112 are shown in FIG. 2 in a column, the transducer elements can be arranged in other configurations, such as in an arc or other non-linear configuration provided the non-linear configuration is accompanied by appropriate computational changes to account for the particular configuration. The distance from the $i^{th}$ transducer element at time sample n, $d_i[n]$, to the focal point shown in FIG. 2 can be expressed mathematically using the Pythagorean theorem as:

$$d_i[n] = \sqrt{(R_{fp}[n]\sin(\theta) - (x_i - x_c))^2 + (R_{fp}[n]\cos(\theta))^2} \qquad (3)$$

where:

$R_{fp}[n]$ is the radial distance from the focal point to the spatial center of the active transducer array elements at time sample n shown in FIG. 2 as $x_c$; with the actual physical center of the transducer array shown as $x_0$ $\theta$ is the angle between the scanline and the $Z_c$ reference axis $x_i$ is the lateral distance of the $i^{th}$ transducer element from the Z axis which is based on the position of $x_0$ $x_c$ is the lateral distance of the $Z_c$ axis from the Z axis To compute the total amount of delay time (i.e., both integer and fractional) it takes for a sound wave to propagate the distance d[n] between the focal point of the target tissue 105 and the $i^{th}$ transducer element, the distance $d_i[n]$ can be divided by the speed of sound, c, for the material/medium. This delay time, shown below as $\tau_i[n]$, can be represented in terms of discrete-time samples by multiplying by the sampling rate of the beamforming system (not shown), $f_s$ as follows $$\tau_i[n] = \frac{f_s}{c} \sqrt{(R_{fp}[n]\sin(\theta) - (x_i - x_c))^2 + (R_{fp}[n]\cos(\theta))^2} \qquad (4)$$

The Inventor has recognized that Equation 4 is not well suited for real-time implementation because of the trigonometric functions (both $\sin(\theta)$ and $\cos(\theta)$) and numerous multiplications involved. As a result, the Inventor has recognized more system insight and mathematical simplifications are needed before an equation to determine the appropriate delay times for the drive signal applied to the respective transducer elements can reasonably be implemented in real time.

The Inventor has discovered that the simplifications can start by squaring the terms inside the square root in Equation 4 to yield $$\tau_i[n] = \sqrt{\left(\frac{f_s}{c}\right)^2 ((x_c - x_i)^2 + 2(x_c - x_i)R_{fp}[n]\sin(\theta) + R_{fp}^2[n])} \quad (5)$$

By referring back to FIG. 2 the following mathematical relationship can now be recognized $$R_{fp}[n] = n\left(\frac{c}{2f_s}\right) \quad (6)$$

between the radial distance of the focal point, $R_{fp}[n]$, the speed of sound in the particular medium, c, the sampling rate of the beamformer system, $f_s$, and the time sample n. With this relationship, Equation 5 can be simplified to the following form shown as Equation (7) below:

$$\tau_i[n] = \sqrt{\left(\frac{f_s}{c}(x_c - x_i)\right)^2 + n(x_c - x_i)\left(\frac{f_s}{c}\right)\sin(\theta) + \frac{n^2}{4}} \quad (7)$$

Equation 7 only includes two terms that are a function of the time sample n. Furthermore, the non-time sample term $$(x_c - x_i)\left(\frac{f_s}{c}\right)$$

is only a function of the transducer position ($x_c$ relative to $x_i$) and can be computed in non-real time (e.g. a priori) and stored in a look-up table in memory. Moreover, the $\sin(\theta)$ term is fixed for a given scanline and can also be stored in a look-up table. Accordingly, although $\sin(\theta)$ term is updated once for each new scan line, since $\theta$ is known and is constant for a particular scanline, the $\sin(\theta)$ term can be provided by a look-up table. As a result, the only multiply that is present in Equation 7 is for the $n^2/4$ term.

To eliminate the multiply term ($n^2/4$) in Equation 7, the Inventor has discovered that the above equations can be manipulated into an iterative form. For example, by squaring Equation 5 and taking the difference between squared time delay values $\tau$ for time sample n, $\tau(n)$, and the delay values at time sample n+1, $\tau(n+1)$, with the resulting difference equation becoming Equation 8 shown below $$\tau_i^2[n+1] - \tau_i^2[n] = \quad (8)$$

$$\left(\left(\frac{f_s}{c}(x_c - x_i)\right)^2 + (n+1)(x_c - x_i)\left(\frac{f_s}{c}\right)\sin(\theta) + \frac{(n+1)^2}{4}\right) -$$

$$\left(\left(\frac{f_s}{c}(x_c - x_i)\right)^2 + n(x_c - x_i)\left(\frac{f_s}{c}\right)\sin(\theta) + \frac{n^2}{4}\right)$$

Equation 8 can be simplified into the following form $$\tau_i[n+1] = \sqrt{(x_c - x_i)\left(\frac{f_s}{c}\right)\sin(\theta) + \frac{2n+1}{4} + \tau_i^2[n]} \quad (9)$$

As a result, the time delay value for the $i^{th}$ transducer element at time sample n+1 to account for the delay in the signal between the target tissue 105 and the $i^{th}$ transducer can be expressed a function of the time delay value for the same $i^{th}$ transducer element at time sample n (immediately previous time sample) using Equation 8. Analogous to Equation 7 as described above, although the $\sin(\theta)$ term is updated once for each new scan line, since $\theta$ is known for a fixed particular scanline, the $\sin(\theta)$ term calculation in Equation 8 is not computationally burdensome.

Figure 3:
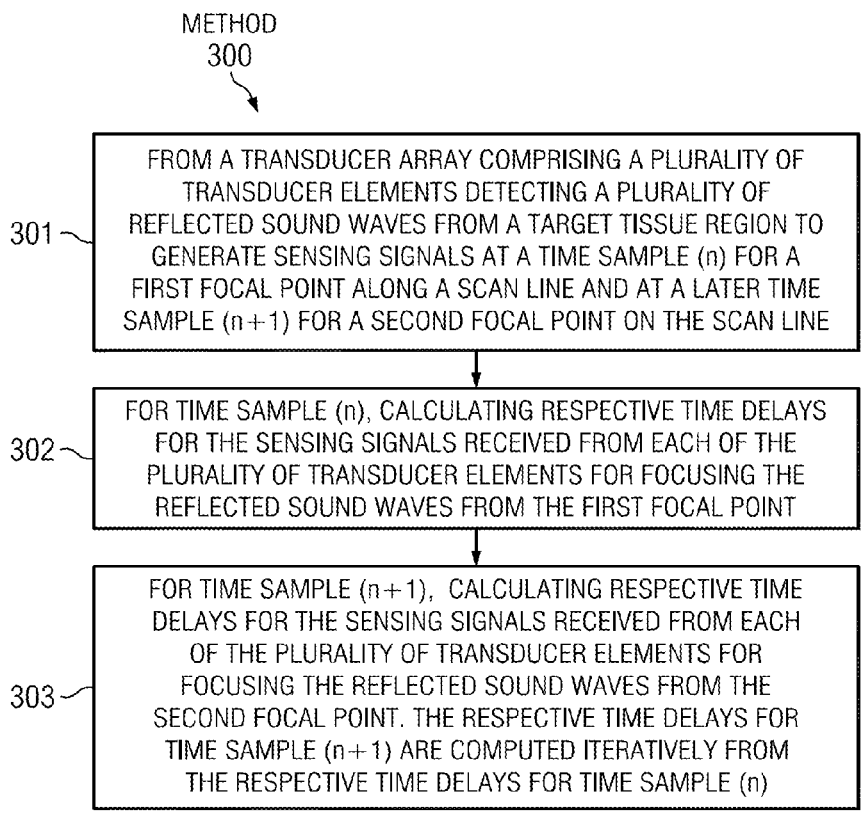
FIG. 3 is a flow chart for an iterative method of computing time delay values for ultrasound receive beamforming, according to an embodiment of the invention.

FIG. 3 is a flow chart for an iterative method 300 of computing time delay values for ultrasound receive beamforming, according to an embodiment of the invention. Step 301 comprises from a transducer array comprising a plurality of transducer elements detecting a plurality of reflected sound waves from the target tissue region to generate sensing signals at a time sample (n) from a first focal point along a scan line, and at a later time sample (n+1) for a second focal point on the scan line. In Step 302, at the time sample (n), respective time delays are calculated for the sensing signals received from each of the plurality of transducer elements for focusing the reflected sound waves from the first focal point. In Step 303, at the time sample (n+1), respective time delays are calculated for sensing signals received from each of the plurality of transducer elements for focusing the reflected sound waves from the second focal point. The respective time delays at time sample (n+1) are computed iteratively from the respective time delays at time sample (n).

In one embodiment the time delay at time sample (n+1) for an $i^{th}$ element of the plurality of transducer elements is computed iteratively using Equation 9 shown above, repeated below:

$$\tau_i[n+1] = \sqrt{(x_c - x_i)\left(\frac{f_s}{c}\right)\sin(\theta) + \frac{2n+1}{4} + \tau_i^2[n]} \quad (9)$$

where as shown in FIG. 2 described above $x_c$ is a position corresponding to a spatial center of active ones of the plurality of transducer elements at time sample (n) and time sample (n+1), $x_i$ is a position of the $i^{th}$ transducer elements, $\theta$ is a steering angle that defines an angle between the scanline and a reference axis, $f_s$ is a sampling frequency, and c is the speed of sound in the target tissue region.

The method can further comprise moving the beamformer to a third focal point along a new (i.e. off the previous scan line) scan line. Using Equation 9, the calculating of respective time delays for the plurality of transducer elements at a time sample after time sample (n+1) for the third focal point can comprise obtaining a new value for $\sin(\theta)$ that reflects a change in the steering angle from a look-up table in memory.

Figure 4:
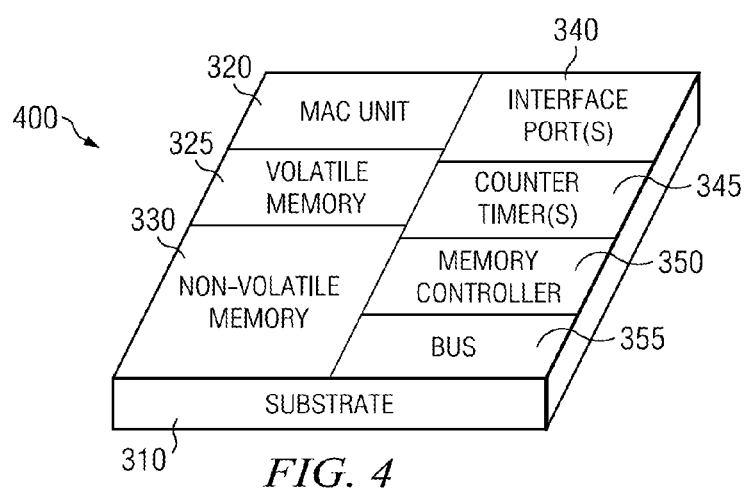
FIG. 4 is a simplified block diagram of a digital signal processor (DSP) IC that iteratively computes time delay values for ultrasound receive beamforming, according to a disclosed embodiment.

FIG. 4 is a simplified block diagram of a digital signal processor (DSP) IC 400 that iteratively computes time delay values for ultrasound receive beamforming, according to a disclosed embodiment. DSP 400 can implement the data architecture shown in FIG. 1 for all system components between integer delays 118 and adder 121. Cycle count performance improvements provided by more efficiently computation of time delay values as described herein enable fewer trigonometric computations and fewer multipliers including multiplier dependency as compared to the conventional general form (Equation 4 above) for computing time delay values. Iterative implementations according to disclosed embodiments thus allow improved cycle count performance per block of beamformed data, allow more blocks of beamformed data and/or more scanlines to be processed per DSP (or other computational device).

DSP IC 400 is shown formed on a substrate 310 having a semiconductor surface (e.g., a silicon substrate) and comprises a multiply-accumulate (MAC) unit 320 that is operable to compute time delay values using algorithms disclosed herein and to generate control signals. DSP IC 400 generally includes a volatile memory (e.g., RAM) 325 and non-volatile memory (e.g., ROM) 330. Algorithms according to embodiments of the invention can be stored in non-volatile memory 330. The DSP IC 300 is also shown including interface port(s) 340 for inputs and outputs, counter/timers 345, memory controller 350 and bus 355.

As with conventional DSPs, the DSP IC 400 can execute instructions to implement one or more digital signal processing algorithms or processes. For instance, the instructions data can include various coefficients and instructions that, when loaded and initialized into DSP IC 400, can prompt the digital signal processor IC 400 to implement different digital signal processing algorithms or processes, such as a digital filter. For example, for receive beamforming, DSP IC 400 can receive digitized sensing signal data from the ADC's 117 shown in FIG. 1 and then apply an algorithm to the data in real time to calculate the integer delays and implements integer delays 118, and calculate the fractional delay and implement the fractional delays at the interpolation filter banks 119 for each interpolation filter at each time instant for each data channel.

Figure 5:
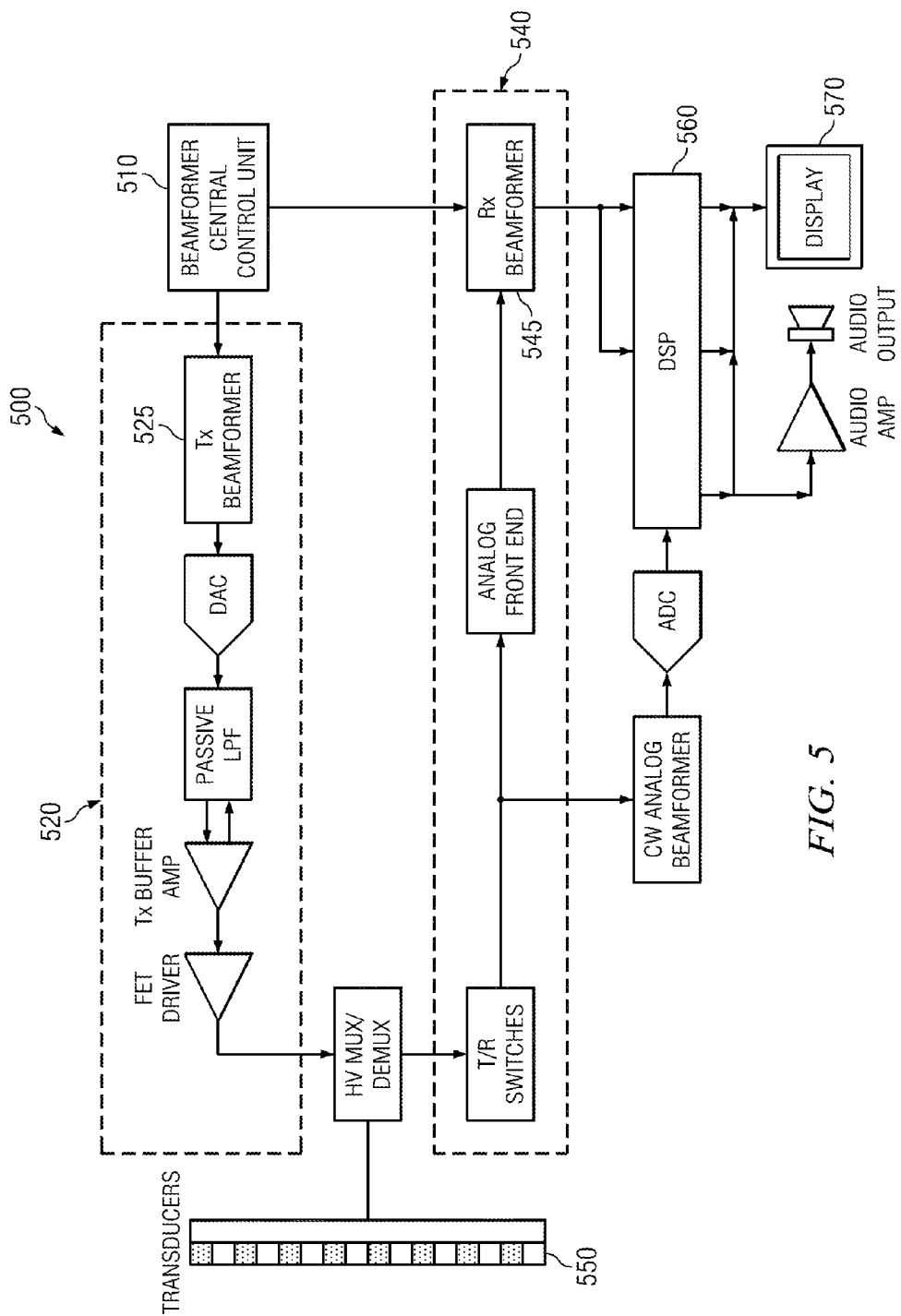
FIG. 5 is a block diagram of an exemplary ultrasound system that iteratively computes time delay values for ultrasound receive beamforming, according to a disclosed embodiment.

FIG. 5 is a block diagram of an exemplary ultrasound system 500 that iteratively computes time delay values for ultrasound receive beamforming, according to a disclosed embodiment. System 500 includes a transmit section 520 comprising transmit (Tx) beamformer 525 and a receive section 540 comprising receive (Rx) beamformer 545 that share a common array of transducers 550. System 500 includes a beamformer central control unit 510 that is coupled to both Tx beamformer 525 and Rx beamformer 545. Beamformer central control unit 510 can be embodied as a DSP, such as DSP IC 400 described above relative to FIG. 4, for iteratively computing time delay values for the Rx beamformer 545. Rx beamformer 545 of receive section 540 is coupled to a back-end imaging DSP 560. Backend imaging DSP 560 is coupled to a display 570.

Benefits of the iterative time delay value computation described above include fewer trigonometric computations and fewer multipliers including multiplier dependency as compared to the conventional general form for computing time delay values (Equation 4 above). Iterative implementations according to disclosed embodiments thus allow improved cycle count performance per block of beamformed data, allow more blocks of beamformed data and/or more scanlines to be processed per DSP or other computational device. Disclosed embodiments also enable real-time implementation of time-delay computations that enables implementations (FPGA, DSP, or ASIC) to require less chip area or support more data channels for a given chip area.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of embodiments of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A digital signal processor (DSP) IC for ultrasound signal processing, comprising:

a substrate having a semiconductor surface;

a multiply-accumulate (MAC) unit on said semiconductor surface that is configured to compute respective time delays for receive beamforming for an ultrasound beamforming system having a plurality of transducer elements, wherein respective time delays at a later time sample (n+1) for a second focal point on a scan line are iteratively computed from respective time delays at an earlier time sample (n) for a first focal point along said scan line using an iterative equation $$\tau_i[n+1] = \sqrt{(x_c - x_i)\left(\frac{f_s}{c}\right)\sin(\theta) + \frac{2n+1}{4} + \tau_i^2[n]}$$

where $x_c$ is a position corresponding to a spatial center of active ones of said plurality of transducer elements at said time sample (n) and said time sample (n+1), $x_i$ is a position of an $i^{th}$ element of said plurality of transducer elements, $\theta$ is a steering angle that defines an angle between said scanline and a reference axis, $f_s$ is a sampling frequency, and c is the speed of sound in said target tissue region.

2. The DSP IC of claim 1, wherein said DSP IC further comprises non-volatile memory on said semiconductor surface that is coupled to said MAC unit, wherein said iterative equation is stored in said non-volatile memory.

* * * * *